United States Patent
Aggarwal et al.

(10) Patent No.: US 12,385,450 B2
(45) Date of Patent: Aug. 12, 2025

(54) AXIAL FAN FOR AIR COOLED ELECTRICAL AIRCRAFT MOTOR

(71) Applicants: Safran Electrical & Power, Blagnac (FR); Safran Power USA, LLC, Wilmington, DE (US)

(72) Inventors: Sachin Aggarwal, Moissy-Cramayel (FR); Matthew Fallon, Moissy-Cramayel (FR); Nicodeme Faucher, Moissy-Cramayel (FR); Abdoulahad Thiam, Moissy-Cramayel (FR)

(73) Assignees: Safran Electrical & Power, Blagnac (FR); Safran Power USA, LLC, Wilmington, DE (US)

( * ) Notice: Subject to any disclaimer, the term of this patent is extended or adjusted under 35 U.S.C. 154(b) by 125 days.

(21) Appl. No.: 17/950,497

(22) Filed: Sep. 22, 2022

(65) Prior Publication Data
US 2024/0102432 A1  Mar. 28, 2024

(51) Int. Cl.
*F02K 5/00* (2006.01)
*B64D 27/24* (2024.01)
*B64D 33/08* (2006.01)

(52) U.S. Cl.
CPC ............... *F02K 5/00* (2013.01); *B64D 27/24* (2013.01); *B64D 33/08* (2013.01)

(58) Field of Classification Search
CPC . F02K 5/00; B64D 33/08; H02K 5/18; H02K 5/20; H02K 7/1823; H02K 9/14; H02K 9/06; F04D 19/002; F04D 29/5806; F04D 29/582; B64U 20/94; B64U 20/96
See application file for complete search history.

(56) References Cited

U.S. PATENT DOCUMENTS

| | | | | |
|---|---|---|---|---|
| 3,643,119 A | * | 2/1972 | Lukens | H02K 9/06 310/60 R |
| 5,915,324 A | * | 6/1999 | Gongwer | B63H 5/165 114/151 |
| 6,386,830 B1 | * | 5/2002 | Slipper | F04D 29/384 416/223 R |

(Continued)

FOREIGN PATENT DOCUMENTS

| | | | | |
|---|---|---|---|---|
| FR | | 860037 A | 1/1941 | |
| FR | | 3063403 A1 | * 8/2018 | ............... H02K 5/18 |

(Continued)

OTHER PUBLICATIONS

PCT/US2022/052163, International Search Report and Written Opinion, dated Jun. 13, 2023, 14 pages.

*Primary Examiner* — Courtney D Heinle
*Assistant Examiner* — Ryan C Clark
(74) *Attorney, Agent, or Firm* — Kilpatrick Townsend & Stockton LLP

(57) ABSTRACT

Described is a fan assembly for an electrical aircraft motor having an axial fan with an inner hub of a first diameter and an outer hub of a second diameter. The outer hub may be concentrically aligned with the inner hub. A plurality of blades may extend between the inner hub and the outer hub. The fan assembly may also have a mounting plate connected to the inner hub. The mounting plate may attach to a component of the electrical aircraft motor.

18 Claims, 6 Drawing Sheets

(56) References Cited

U.S. PATENT DOCUMENTS

| | | | |
|---|---|---|---|
| 6,702,548 B1* | 3/2004 | Lievens | F04D 19/002 |
| | | | 416/243 |
| 2006/0102780 A1* | 5/2006 | Parks | B64D 33/08 |
| | | | 244/53 B |
| 2010/0187922 A1* | 7/2010 | Sheppard | H02K 7/14 |
| | | | 310/59 |
| 2020/0006997 A1* | 1/2020 | Kim | H02K 5/04 |
| 2020/0052544 A1* | 2/2020 | Zhu | H02K 11/21 |
| 2020/0056662 A1* | 2/2020 | Judge | F16C 37/00 |
| 2021/0288553 A1* | 9/2021 | Day | H02K 9/06 |
| 2022/0069757 A1 | 3/2022 | Berry et al. | |
| 2022/0077749 A1* | 3/2022 | Cuenot | H02K 11/33 |

FOREIGN PATENT DOCUMENTS

| | | | | |
|---|---|---|---|---|
| FR | 3128077 A1 | 4/2023 | | |
| GB | 2369161 A * | 5/2002 | | B64C 11/14 |
| WO | WO-2023006473 A1 * | 2/2023 | | |

* cited by examiner

AXIAL FAN FOR AIR COOLED ELECTRICAL AIRCRAFT MOTOR

FIELD OF THE INVENTION

The field of the invention relates to cooling aircraft motors. In particular, cooling electrical aircraft motors.

BACKGROUND

Air cooled aircraft motors may rely on the circulation of air over cooling fins affixed to the motor or circulation of air directly over portions of the motor itself. The circulation of air may be satisfied by ram air from in-flight motion or by propeller wash.

SUMMARY

The terms "invention," "the invention," "this invention" and "the present invention" used in this patent are intended to refer broadly to all the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a fan assembly for an electrical aircraft motor is described. The fan assembly may include an axial fan. The axial fan may be defined by an inner hub having a first diameter and an outer hub having a second diameter. The outer hub may be concentrically aligned with the inner hub. A plurality of blades may extend between the inner hub and the outer hub. A mounting plate may be connected to the inner hub. The mounting plate may be connected to the inner hub and arranged for mounting the fan assembly to a component of the electrical aircraft motor. The first diameter may correspond to a third diameter of the electrical aircraft motor and the second diameter may correspond to a fourth diameter of the electrical aircraft motor.

According to certain embodiments of the present disclosure, a system including an electrical aircraft motor with an annular body and a set of cooling fins extending from the annular body is described. The system may also include an axial fan connected to the electrical aircraft motor. The axial fan may be defined by an inner hub having a first diameter that may correspond to the annular body. The axial fan may also be defined by an outer hub having a second diameter that may be concentrically aligned with the inner hub. The second diameter may correspond to the set of cooling fins. The axial fan may also include a plurality of blades extending between the inner hub and the outer hub.

According to certain embodiments of the present disclosure, a system including an electrical aircraft motor is described. The electrical aircraft motor may have a first annular housing that may include an electrical motor, a second housing that may include electronics, and a motor shaft that may be connected to the electrical motor. The system may also include an axial fan connected to the motor shaft. The axial fan may have an inner hub defined by a first diameter that may correspond to the first annular housing. The axial fan may also have an outer hub defined by a second diameter. The outer hub of the axial fan may be concentrically aligned with the inner hub, wherein the second diameter may be greater than the first diameter. The axial fan may have a plurality of blades extending between the inner hub and the outer hub.

DETAILED DESCRIPTION

Figure 1:
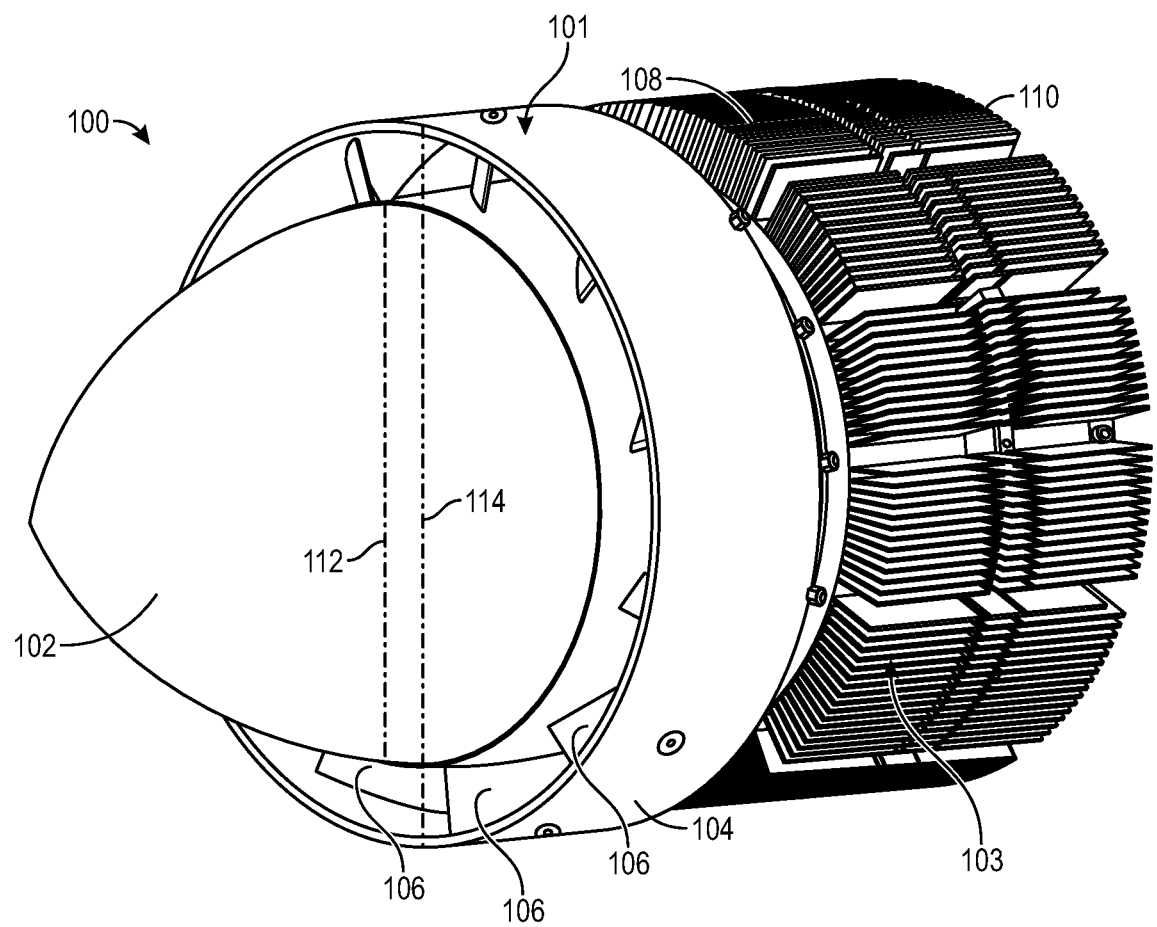
FIG. 1 is an isometric view of a fan-cooled motor system for cooling an electrical aircraft motor, according to at least one example.

The subject matter of embodiments of the present disclosure is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the disclosure provide an axial fan for an electrical aircraft motor. While the axial fan for the electrical aircraft motor is discussed for use with electrical aircraft motors, they are by no means so limited. Rather, embodiments of the axial fan may be used in any other suitable application for directing airflow, exhaust, and the like.

An electrical aircraft motor may be adequately cooled in certain scenarios but may require additional cooling in other scenarios. For example, an electrical aircraft motor may be adequately cooled by ram air when the aircraft is in flight or when propeller wash provides adequate airflow. Even so, the electrical aircraft motor may lack adequate cooling during ground operating condition such as taxiing. A lack of adequate cooling may be especially problematic when taxiing precedes takeoff, where the demands on the aircraft motor's power output may be the highest. A lack of adequate cooling of the power supply electronics may also negatively impact avionics equipment.

The lack of adequate cooling may be compounded by certain design decisions, such as housing power supply electronics close to the aircraft motor. Phase-change heat exchanges, such as water-cooling systems, may add undesirable weight, cost, or complexity to a design. An axial fan may compensate for the lack of airflow in some such scenarios.

In a particular example, the axial fan described herein may be driven by a motor shaft common to the propeller and aircraft motor. In an alternative example, a gearbox between the propeller and the motor shaft may drive the axial fan. In such an example, the gearbox may allow the propeller, motor shaft, or axial fan to operate at different rotational speeds. The axial fan may be directed at cooling fins that may be affixed to the aircraft motor and a housing including power supply electronics. The cooling fins may be positioned within an annulus flow region of an assembly containing the aircraft motor, the housing including the power supply electronics, and the motor shaft. The axial fan may be fashioned to increase weight minimally and may not draw consequential power from the motor shaft. The axial fan may be fashioned and positioned so that it does not negatively impact in-flight operating conditions like take-off, cruising, and landing. The axial fan may avoid such negative impacts by cooling fins on the housing of the aircraft motor rather than cooling the motor cavity of the aircraft motor directly.

Turning now to the figures, FIG. 1 is an isometric view of a fan-cooled motor system 100 for cooling an electrical aircraft motor 103, according to at least one example. The fan-cooled motor system 100 includes a fan assembly 101 and the electrical aircraft motor 103. The fan assembly 101 includes a spinner cone 102 and an axial fan 104 with blades 106. An inner hub of the axial fan 104 may have a first diameter 112 and an outer hub of the axial fan 104 may have a second diameter 114. In some examples, the axial fan 104 may have between seven and thirty blades 106. In some examples, the axial fan 104 may have less than seven blades 106 or more than thirty blades 106. As should be appreciated, the number of blades 106 may depend on certain design considerations such as flow required for cooling, fan weight, power required to spin the axial fan 104, and other similar considerations. The axial fan 104 may be adapted to any suitable alternate geometry of the spinner cone 102. In some examples, the axial fan 104 may be integral to the spinner cone 102. The axial fan 104 may be formed of materials including but not limited to aluminum, stainless steel, fiberglass, graphite fiber, nickel-aluminum-bronze alloy, manganese bronze alloy, other metallic materials, composite materials, or other suitable similar materials.

The electrical aircraft motor 103 includes an aircraft motor 108 enclosed within a motor housing and power supply electronics 110 enclosed within an electronics housing. Airflow provided by the axial fan 104 may provide cooling via flow over the fins of the electrical aircraft motor 103. In particular, electrical aircraft motor 103 may include cooling fins 111, disposed radially about the housings of the aircraft motor 108 and the power supply electronics 110.

Figure 2:
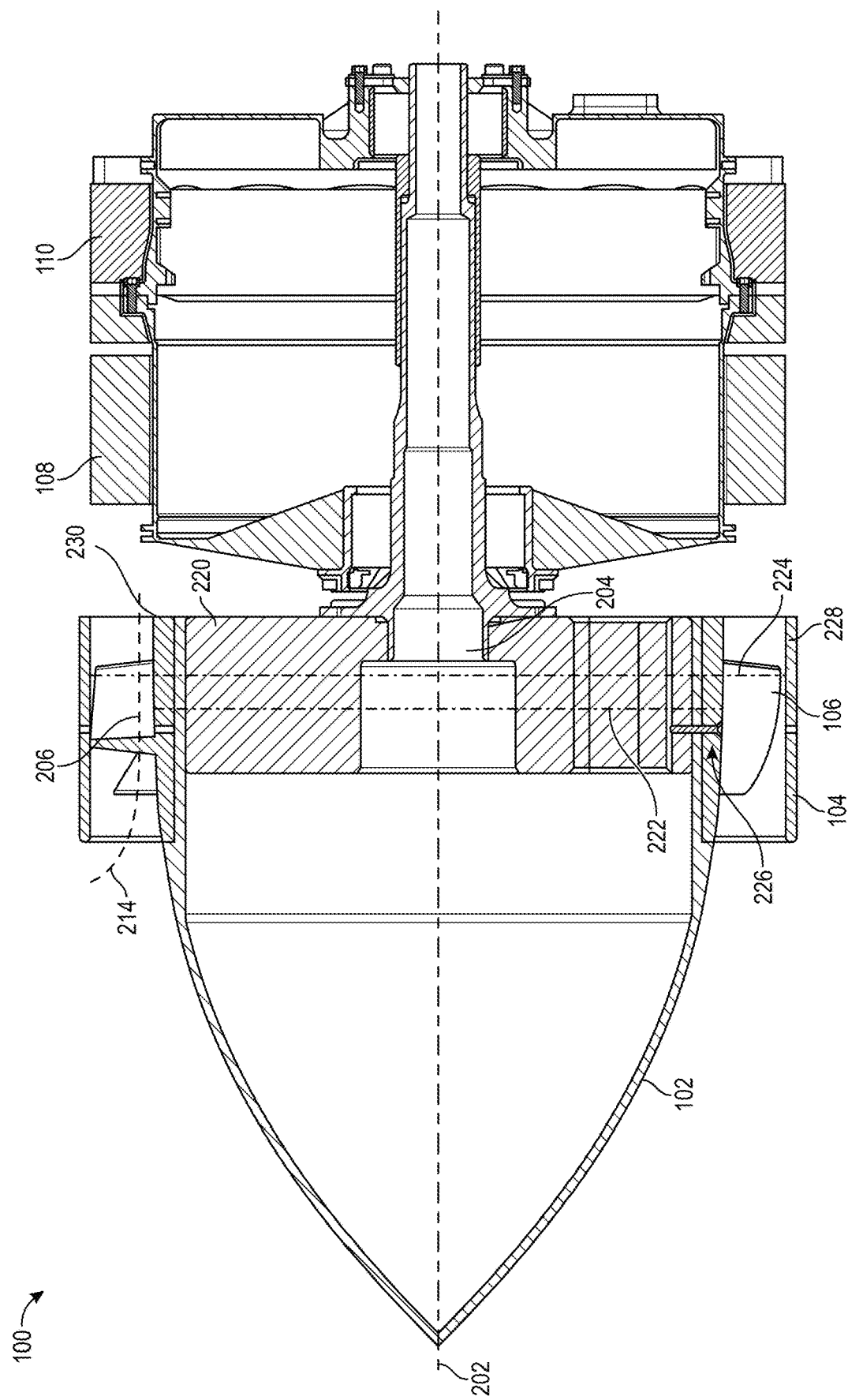
FIG. 2 is a sectional view of a fan-cooled motor system for cooling an electrical aircraft motor, according to at least one example.

FIG. 2 is a sectional view of the fan-cooled motor system 100 for cooling the electrical aircraft motor 103, according to at least one example. As illustrated, the spinner cone 102 is aligned with a rotational axis 202 that extends through a center of the fan-cooled motor system 100. The spinner cone 102 may be integrally formed with the axial fan 104. The blades 106 of the axial fan 104 may direct airflow 214 through an annulus 206 of the spinner cone 102. An inner hub 226 of the axial fan 104 may have a first diameter 222 and an outer hub 228 of the axial fan 104 may have a second diameter 224. In some examples, the first diameter 222 may correspond to a smallest diameter of the inner hub 226 (e.g., a surface that faces towards the inner portion of the fan-cooled motor system 100) or may correspond to a largest diameter of the inner hub 226 (e.g., a surface that faces away from the inner portion of the fan-cooled motor system 100). In some examples, the second diameter 224 may correspond to a smallest diameter of the outer hub 228 (e.g., a surface that faces towards the inner portion of the fan-cooled motor system 100) or may correspond to a largest diameter of the outer hub 228). Thus, in some examples, the annulus 206, which may be defined by the difference between the second diameter 224 as measured as the smallest diameter of the outer hub 228 and the first diameter 222 as measured as the largest diameter of the inner hub 226, may be between 5 mm and 50 mm wide. The blades 106 can be axially or radially adjusted based on the width of the annulus 206. The number of blades 106 may vary between seven and thirty, depending on the size of the annulus 206.

The first diameter 222 may correspond to a third diameter of the aircraft motor 108 and the second diameter 224 may correspond to a fourth diameter of the aircraft motor 108. The annulus 206 may also be defined by the difference between the fourth diameter and the third diameter of the aircraft motor 108. The cooling fins 111 of the aircraft motor 108 may fit within the space between the fourth diameter and the third diameter. In some examples, the height of the cooling fins 111.

The airflow 214 may fluidly communicate with cooling fins 111 of the aircraft motor 108 and power supply electronics 110. The height of the cooling fins 111 may correspond to the size of the annulus 206. Swirling airflow may be caused by the axial fan 104. In some examples, the height of the cooling fins 111 may be about the same as the width of the annulus 206. In some examples, the width of the annulus 206 may be greater than height of the cooling fins 111 or smaller than the height of the cooling fins 111. In alternative examples, a flow-straightening component, such as an air straightener screen 230 may be introduced between the axial fan 104 and the aircraft motor 108 to mitigate swirling airflow within the annulus 206. The air straightener screen 230 may include a pattern of hexagonal channels. In some examples, other form factors of flow-straightening components may be used.

The power supply electronics 110 may supply electrical power to the aircraft motor 108. The aircraft motor 108 may turn a motor shaft 204. A mounting plate 220 may connect an inner hub 226 of the axial fan 104 to the motor shaft 204 via suitable fasteners, which include but are not limited to screws, bolts, rivets, or other mechanical or chemical fasteners. Motion of the motor shaft 204 may cause the axial fan 104 to produce the airflow 214 through the annulus 206. In some examples, the inner hub 226 of the axial fan 104 may be integrally formed with the spinner cone 102. While not shown, the motor shaft 204 may also be used to turn a propeller of the fan-cooled motor system 100.

Figure 3:
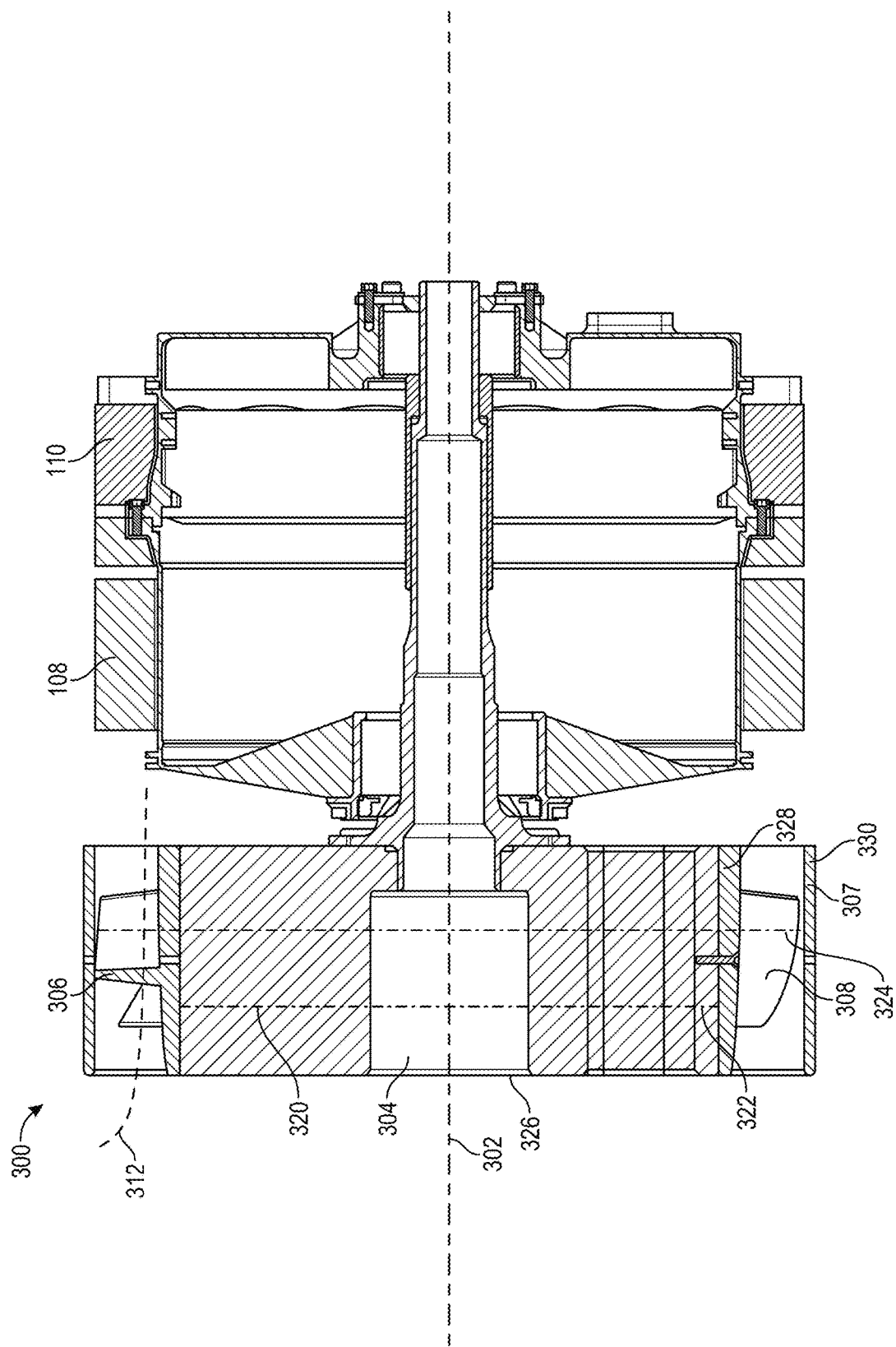
FIG. 3 is a sectional view of a fan-cooled motor system for cooling an electrical aircraft motor, according to at least one example.

FIG. 3 is a sectional view of a fan-cooled motor system 300 for cooling an electrical aircraft motor, according at least one example. The fan-cooled motor system 300 is an alternative example of the fan-cooled motor system 100 described herein. The axial fan 307 is an alternative example of the axial fan 104 described herein. The motor shaft 304 is an alternative example of the motor shaft 204 described herein. The present example may differ from the example illustrated in FIG. 2 because the axial fan 307 is not integrally formed with a propeller spinner. As a result, the axial fan 307 may be directly installed on the motor shaft 304, which may alter the position of the axial fan 307 relative to the motor shaft 304 and may alter the distance between the axial fan 307 and the aircraft motor 108. An inner hub 328 of the axial fan 307 may have a first diameter 322 and an outer hub 330 of the axial fan 307 may have a second diameter 324. The values of the diameters described with respect to FIG. 2 may be equally applicable to the diameters shown in FIG. 3.

Blades 308 of the axial fan 307 may direct airflow 312 through an annulus 306 of the fan-cooled motor system 300. The annulus 306 is an alternative example of the annulus 206 described herein. The airflow 312 may fluidly communicate with cooling fins 111 of the aircraft motor 108 and the power supply electronics 110. The airflow 312 is an alternative example of the airflow 214 described herein. The axial fan 307 may be formed of materials including but not limited to aluminum, stainless steel, fiberglass, graphite fiber, nickel-aluminum-bronze alloy, manganese bronze alloy, other metallic materials, composite materials, or other similar materials. The sizes of the inner hub, the outer hub, the annulus 306, and the fin shown in FIG. 3 may be similar configured those elements shown in FIG. 2.

A mounting plate 326 may connect to an inner hub 328 of the axial fan 307 to the motor shaft 304 via suitable fasteners, which include but are not limited to screws, bolts, rivets, or other mechanical or chemical fasteners. The mounting plate 326 may also connect a narrow region of a propeller spinner cone to the motor shaft 304. Motion of the motor shaft 304 may cause the axial fan 307 to produce the airflow 312 through the annulus 306.

Figure 4:
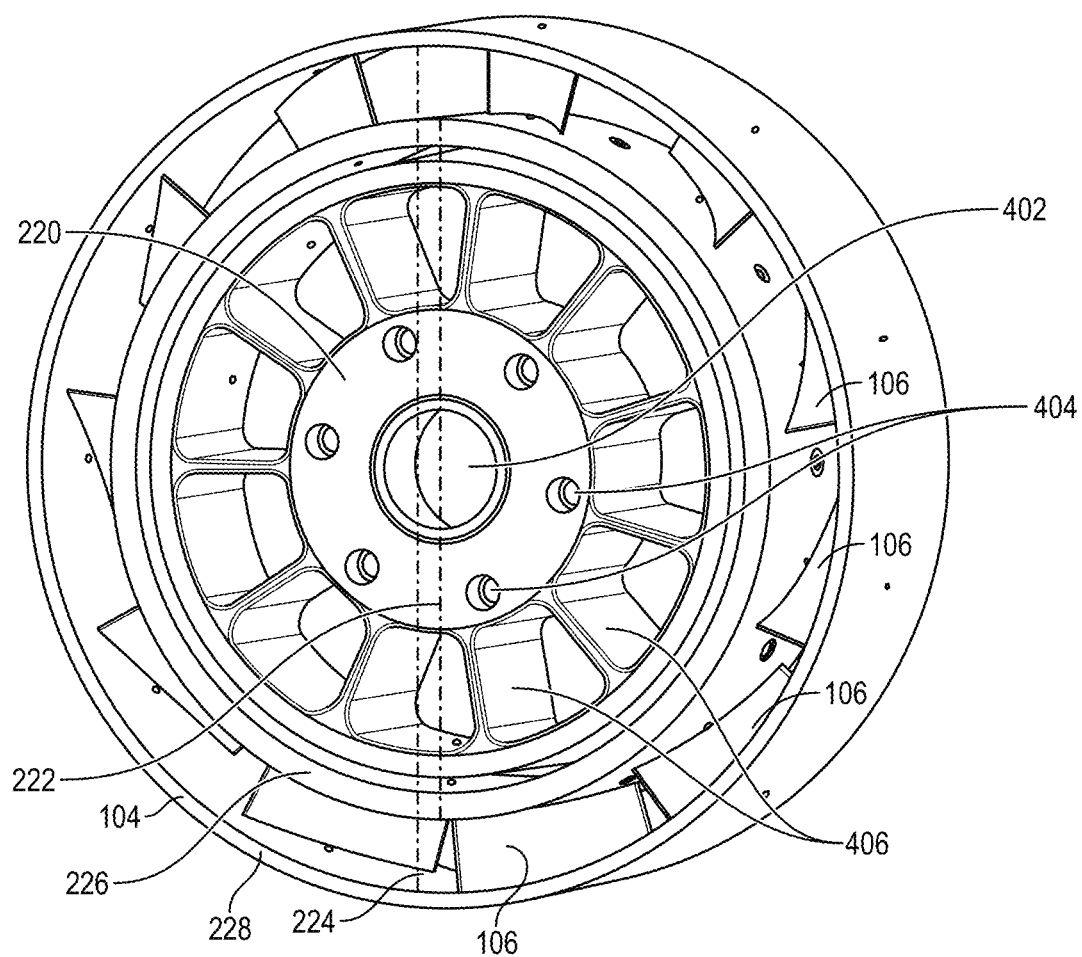
FIG. 4 is an isometric view of an axial fan and a mounting plate, according to at least one example.

FIG. 4 is an isometric view of an axial fan 104 and a mounting plate 220 according to at least one example. The axial fan 104 is depicted with a spinner cone 102, integral to the axial fan 104, in FIG. 1 and FIG. 2. An inner hub 226 of the axial fan 104 may have a first diameter 222 and an outer hub 228 may have a second diameter 224. The outer hub 228 may be concentrically aligned with the inner hub 226. The blades 106 of the axial fan 104 may extend between the inner hub 226 and the outer hub 228. The outer hub 228 may reduce tip losses and may contribute to the structural integrity of the axial fan 104. The mounting plate 220 may be integrally formed with the inner hub 226 and may extend radially from the center of the axial fan 104 to the first diameter 222 of the inner hub 226. The outer hub 228 of the axial fan 104 may comprise a ring of uniform thickness characterized by the second diameter 224 as an inner ring and a fifth diameter of some thickness as an outer ring. The inner hub 226 of the axial fan 104 may be connected to the outer hub 228 of the axial fan 104 by the plurality of blades 106 between the inner hub 226 and the outer hub 228. The root of each of the blades 106 may be connected to the inner hub 226 and the tip of each blade may be connected to the outer hub 228.

The mounting plate 220 may be connected to a motor shaft, such as the motor shaft 204 of FIG. 2. The mounting plate 220 may be connected by suitable fasteners, which include but are not limited to screws, bolts, rivets, or other mechanical or chemical fasteners. A motor shaft may connect to the mounting plate 220 at a shaft opening 402. Inserts 404 for connecting the mounting plate 220 to the axial fan 104 may be threaded or smooth, depending on the mode of attachment. In an alternative example, a mounting plate similar to the mounting plate 326 of FIG. 3 may connect an axial fan 307, without an integrally attached propeller spinner, to a motor shaft. The mounting plate 220 may be further defined by weight relief features 406, which may reduce rotational inertia, thus reducing power loss.

The first diameter 222 may correspond to a third diameter of the aircraft motor 108 and the second diameter 224 may correspond to a fourth diameter of the aircraft motor 108. The radial distance between the first diameter 222 and the second diameter 224 may be about equal to the radial distance between the third diameter of the aircraft motor 108 and the fourth diameter of the aircraft motor 108.

Figure 5:
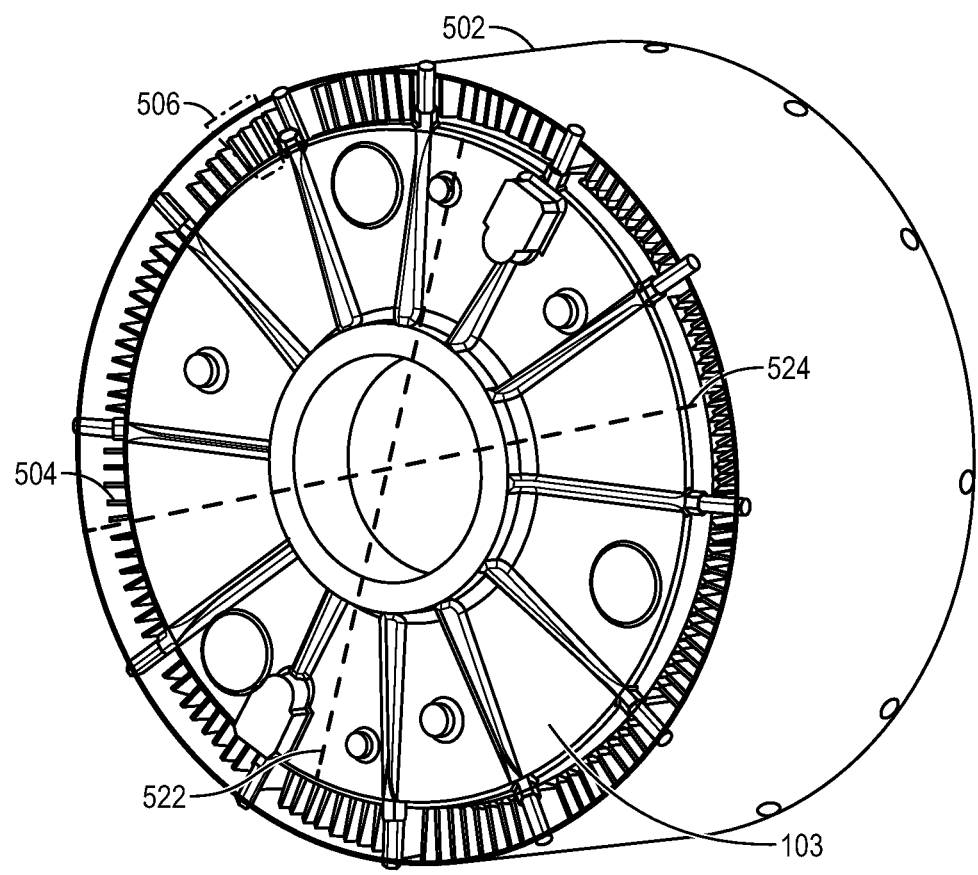
FIG. 5 is an isometric view of an electrical aircraft motor and a set of cooling fins, according to at least one example.

FIG. 5 is an isometric view of an electrical aircraft motor 103 and a set of cooling fins 504 according to at least on example. The set of cooling fins 504 is an example of the cooling fins 111. The electrical aircraft motor 103 may be encompassed by the cooling fins 504. Power supply electronics, such as the power supply electronics 110 of FIG. 1 and FIG. 2, may include similar cooling fins, such as cooling fins 111. The cooling fins 504 may be encompassed by a cowl 502. A third diameter 522, which in some examples may be roughly equal to the first diameter 222, may correspond to the body of the electrical aircraft motor 103. A fourth diameter 524, which in some examples may be roughly equal to the second diameter 224, may correspond to the diameter of the cowl 502. The radial distance between the third diameter 522 and the fourth diameter 524 may be of roughly equal height as the cooling fins 504 that extend from the body of the electrical aircraft motor 103 toward the cowl 502. Airflow may pass through an annulus 506, defined by the difference between the fourth diameter 524 and the third diameter 522.

Figure 6:
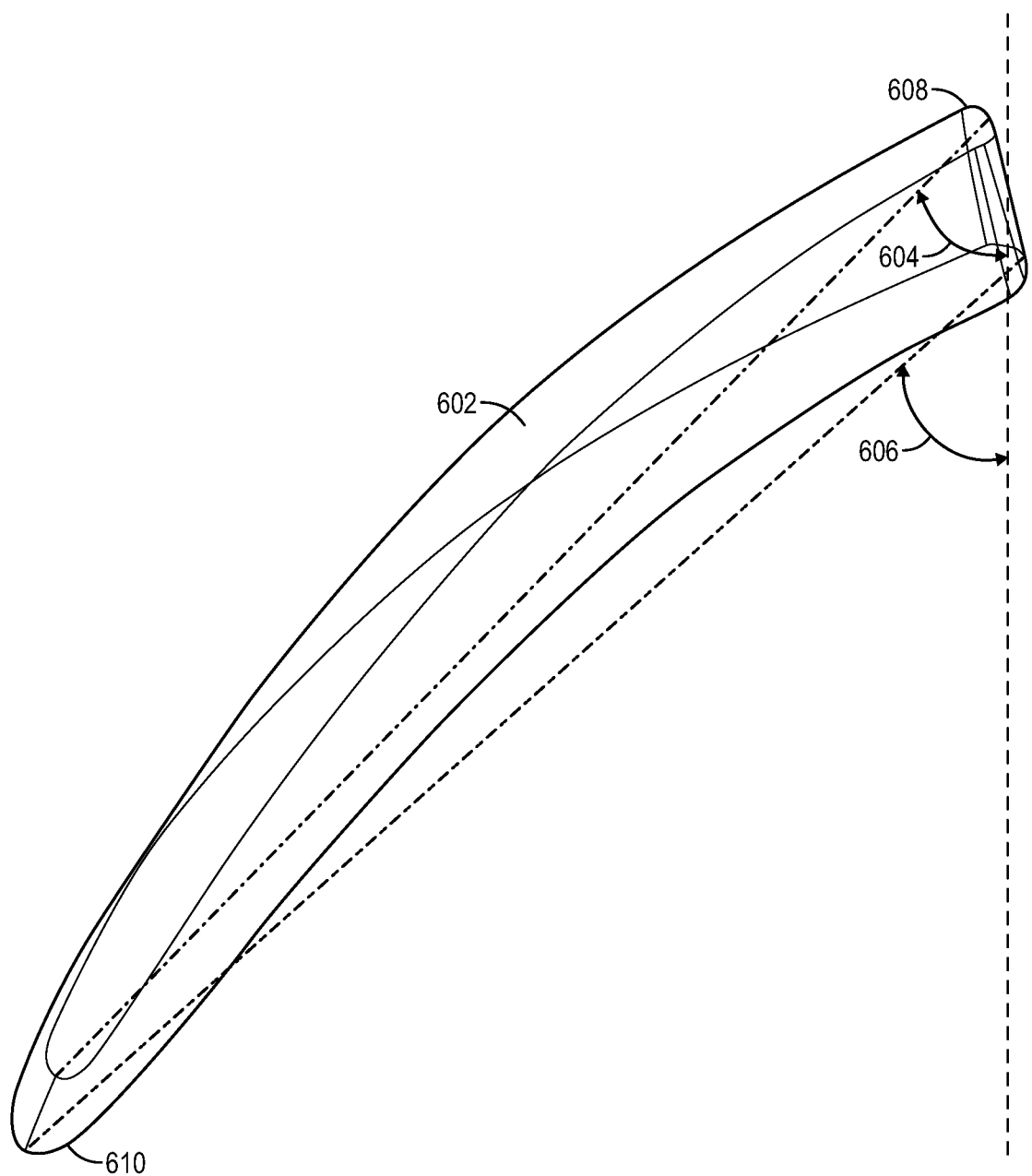
FIG. 6 is a top view of a blade of an axial fan, according to at least one example.

FIG. 6 is a top view of a blade 602 of an axial fan according to at least one example. The blade 602 may be formed of materials including but not limited to aluminum, stainless steel, fiberglass, graphite fiber, nickel-aluminum-bronze alloy, manganese bronze alloy, other metallic materials, composite materials, or other suitable similar materials. The root 608 of the blade may be connected to an inner hub of the axial fan and the tip 610 of the blade may be connected to an outer hub of the axial fan. The blade 602 may taper from the root 608 of the blade to the tip 610 of the blade. The blade 602 may be one of a plurality of blades, between seven and thirty, and may be characterized by a root angle 604 between 25 and 75 degrees. The blade 602 may also be characterized by a tip angle 606 between 25 and 75 degrees. The difference between the root angle 604 and the tip angle 606 may define a twist of the blade 602. Other configurations are also possible. The blade twist, blade thickness, and blade angle may be varied according to the rotational speed of the application in order to maintain aerodynamic flow with minimal flow separation in order to keep energy losses low. The twist may be adjusted, based on the engine for which they are paired, to maintain aerodynamic flow with minimal flow separation.

In the following, further examples are described to facilitate the understanding of the disclosure:

Example A

A fan assembly for an electrical aircraft motor, comprising: an axial fan comprising: an inner hub having a first diameter; an outer hub having a second diameter and being concentrically aligned with the inner hub; and a plurality of blades extending between the inner hub and the outer hub; and a mounting plate connected to the inner hub and configured for mounting the fan assembly to a component of the electrical aircraft motor, wherein the first diameter corresponds to a third diameter of the electrical aircraft motor and the second diameter corresponds a fourth diameter of the electrical aircraft motor.

Example B

The fan assembly of any preceding or subsequent examples, wherein a first radial distance measured between the first diameter and the second diameter is about equal to a second radial distance measured between the third diameter and the fourth diameter.

Example C

The fan assembly of any preceding or subsequent examples, wherein the third diameter corresponds to a body of the electrical aircraft motor and the fourth diameter corresponds to a cowl of the electrical aircraft motor.

Example D

The fan assembly of any preceding or subsequent examples, wherein a radial distance between the third diameter and the fourth diameter is about equal to a height of a set of cooling fins that extend radially from the body of the electrical aircraft motor toward the cowl.

Example E

The fan assembly of any preceding or subsequent examples, wherein a radial distance between the third diameter and the fourth diameter is about equal to a height of a set of cooling fins that extend radially from a body of the electrical aircraft motor.

Example F

The fan assembly of any preceding or subsequent examples, wherein the component comprises at least one of a motor shaft of the electrical aircraft motor or a propeller.

Example G

The fan assembly of any preceding or subsequent examples, wherein the inner hub is integrally formed with a propeller spinner.

Example H

The fan assembly of any preceding or subsequent examples, wherein the plurality of blades comprises a number between seven and thirty.

Example I

The fan assembly of any preceding or subsequent examples, wherein a root of each blade of the plurality of blades is connected to the inner hub and a tip of each blade of the plurality of blades is connected to the outer hub.

Example J

The fan assembly of any preceding or subsequent examples, wherein each blade of the plurality of blades is characterized by a root angle and a tip angle between 25 degrees and 75 degrees.

Example K

The fan assembly of any preceding or subsequent examples, further comprising a cone concentrically aligned with and connected to the inner hub.

Example L

The fan assembly of any preceding or subsequent examples, wherein an annulus region of the cone is between 5 mm and 50 mm wide.

Example M

The fan assembly of any preceding or subsequent examples, wherein the mounting plate is integrally formed with the inner hub and extends radially from a center of the axial fan to the first diameter of the inner hub.

Example N

The fan assembly of any preceding or subsequent examples, wherein the outer hub comprises a ring of uniform thickness characterized by the second diameter as an inner ring diameter and a fifth diameter as an outer ring diameter.

Example O

The fan assembly of any preceding or subsequent examples, wherein the inner hub is connected to the outer hub via the plurality of blades.

Example P

A system, comprising: an electrical aircraft motor comprising an annular body and a set of cooling fins extending from the annular body; and an axial fan connected to the electrical aircraft motor, the axial fan comprising: an inner hub having a first diameter corresponding to the annular body; an outer hub having a second diameter and being concentrically aligned with the inner hub, wherein the second diameter corresponds to the set of cooling fins; and a plurality of blades extending between the inner hub and the outer hub.

Example Q

The system of any preceding or subsequent examples, wherein the electrical aircraft motor further comprises an annular cowl that surrounds the set of cooling fins, wherein a first radial distance between the first diameter and the second diameter is about equal a second radial distance between the annular body and the annular cowls.

Example R

The system of any preceding or subsequent examples, wherein the axial fan is connected to the electrical aircraft motor via a motor shaft of the electrical aircraft motor or via a propeller that is connected to the motor shaft.

Example S

A system, comprising: an electrical aircraft motor housing comprising: a first annular housing that includes an electrical motor; a second housing that includes control electronics; and a motor shaft that is rotatably connected to the electrical motor; and an axial fan connected to the motor shaft, the axial fan comprising: an inner hub having a first diameter corresponding to the first annular housing; an outer hub having a second diameter and being concentrically aligned with the inner hub, wherein the second diameter is greater than the first diameter; and a plurality of blades extending between the inner hub and the outer hub.

Example T

The system of any preceding or subsequent examples, further comprising a propeller, and wherein the axial fan is connected to the motor shaft via the propeller.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications may be made without departing from the scope of the claims below.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (e.g., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and all three of A, B, and C.

Preferred examples of this disclosure are described herein, including the best mode known to the inventors for carrying out the disclosure. Variations of those preferred examples may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

That which is claimed is:

1. A fan assembly for an electrical aircraft motor, comprising:
   an axial fan comprising:
      an inner hub having a first diameter;
      an outer hub having a second diameter and being concentrically aligned with the inner hub; and
      a plurality of blades extending between the inner hub and the outer hub;
   an air straightener screen positioned between the axial fan and the electrical aircraft motor; and
   a mounting plate connected to the inner hub and configured for mounting the fan assembly to a component of the electrical aircraft motor, wherein the mounting plate is integrally formed with the inner hub and extends radially outward from a center of the axial fan to the first diameter of the inner hub such that the axial fan is positioned at a first location that is offset from a second location of the electrical aircraft motor when the fan assembly is mounted to the component of the electrical aircraft motor, wherein the first diameter is the same as a third diameter of the electrical aircraft motor and the second diameter is the same as a fourth diameter of the electrical aircraft motor, wherein a gap is defined between the first location and the second location that is open to an environment, and wherein the inner hub is connected to the outer hub via the plurality of blades.

2. The fan assembly of claim 1, wherein a first radial distance measured between the first diameter and the second diameter is equal to a second radial distance measured between the third diameter and the fourth diameter.

3. The fan assembly of claim 1, wherein the third diameter corresponds to a body of the electrical aircraft motor and the fourth diameter corresponds to a cowl of the electrical aircraft motor.

4. The fan assembly of claim 3, wherein a radial distance between the third diameter and the fourth diameter is equal to a height of a set of cooling fins that extend radially from the body of the electrical aircraft motor toward the cowl.

5. The fan assembly of claim 1, wherein a radial distance between the third diameter and the fourth diameter is equal to a height of a set of cooling fins that extend radially from a body of the electrical aircraft motor.

6. The fan assembly of claim 1, wherein the component comprises at least one of a motor shaft of the electrical aircraft motor or a propeller.

7. The fan assembly of claim 1, wherein the inner hub is integrally formed with a propeller spinner.

8. The fan assembly of claim 1, wherein the plurality of blades comprises a number between seven and thirty.

9. The fan assembly of claim 1, wherein a root of each blade of the plurality of blades is connected to the inner hub and a tip of each blade of the plurality of blades is connected to the outer hub.

10. The fan assembly of claim 1, wherein each blade of the plurality of blades is characterized by a root angle and a tip angle between 25 degrees and 75 degrees.

11. The fan assembly of claim 1, further comprising a cone concentrically aligned with and connected to the inner hub.

12. The fan assembly of claim 11, wherein an annulus region of the cone is between 5 mm and 50 mm wide.

13. The fan assembly of claim 1, wherein the outer hub comprises a ring of uniform thickness characterized by the second diameter as an inner ring diameter and a fifth diameter as an outer ring diameter.

14. A system, comprising:
an electrical aircraft motor comprising an annular body and a set of cooling fins extending from the annular body;
an axial fan connected to the electrical aircraft motor, the axial fan comprising:
an inner hub having a first diameter corresponding to the annular body;
an outer hub having a second diameter and being concentrically aligned with the inner hub, wherein the second diameter corresponds to the set of cooling fins; and
a plurality of blades extending between the inner hub and the outer hub;
an air straightener screen positioned between the axial fan and the electrical aircraft motor; and
a mounting plate connected to the inner hub and configured for mounting the axial fan to the electrical aircraft motor, wherein the mounting plate is integrally formed with the inner hub and extends radially outward from a center of the axial fan to the first diameter of the inner hub such that the axial fan is positioned at a first location that is offset from a second location of the electrical aircraft motor when the axial fan is mounted to the electrical aircraft motor, wherein a gap is defined between the first location and the second location that is open to an environment, and wherein the inner hub is connected to the outer hub via the plurality of blades.

15. The system of claim 14, wherein the electrical aircraft motor further comprises an annular cowl that surrounds the set of cooling fins, wherein a first radial distance between the first diameter and the second diameter is equal to a second radial distance between the annular body and the annular cowls.

16. The system of claim 14, wherein the axial fan is connected to the electrical aircraft motor via a motor shaft of the electrical aircraft motor or via a propeller that is connected to the motor shaft.

17. A system, comprising:
an electrical aircraft motor housing comprising:
a first annular housing that includes an electrical motor;
a second housing that includes control electronics; and
a motor shaft that is rotatably connected to the electrical motor;
an axial fan connected to the motor shaft via a mounting plate, the axial fan comprising:
an inner hub having a first diameter corresponding to the first annular housing;
an outer hub having a second diameter and being concentrically aligned with the inner hub, wherein the second diameter is greater than the first diameter; and
a plurality of blades extending between the inner hub and the outer hub;
an air straightener screen positioned between the axial fan and the electrical aircraft motor; and
the mounting plate that is integrally formed with the inner hub and extends radially outward from a center of the axial fan to the first diameter of the inner hub such that the axial fan is positioned at a first location that is offset from a second location of the electrical aircraft motor when the axial fan is mounted to the electrical aircraft motor, wherein a gap is defined between the first location and the second location that is open to an environment, and wherein the inner hub is connected to the outer hub via the plurality of blades.

18. The system of claim 17, further comprising a propeller, and wherein the axial fan is connected to the motor shaft via the propeller.

* * * * *